(12) United States Patent
Jenkins

(10) Patent No.: US 8,015,286 B2
(45) Date of Patent: Sep. 6, 2011

(54) METHOD AND SYSTEM TO ENABLE CONTACT WITH UNKNOWN INTERNET ACCOUNT HOLDERS

(75) Inventor: Gerald L. Jenkins, Highland Park, IL (US)

(73) Assignee: Gerald L. Jenkins, Highland Park, IL (US)

( * ) Notice: Subject to any disclaimer, the term of this patent is extended or adjusted under 35 U.S.C. 154(b) by 725 days.

(21) Appl. No.: 11/972,248

(22) Filed: Jan. 10, 2008

(65) Prior Publication Data

US 2008/0109531 A1    May 8, 2008

Related U.S. Application Data

(63) Continuation of application No. 09/901,947, filed on Jul. 10, 2001, now Pat. No. 7,340,518.

(60) Provisional application No. 60/217,077, filed on Jul. 10, 2000.

(51) Int. Cl.
*G06F 15/173* (2006.01)
(52) U.S. Cl. ........ 709/225; 709/223; 709/229; 709/206; 726/3; 726/21; 726/27
(58) Field of Classification Search .................. 709/206, 709/223, 225, 229; 726/3–6, 21–27
See application file for complete search history.

(56) References Cited

U.S. PATENT DOCUMENTS

| | | | |
|---|---|---|---|
| 5,822,526 A | 10/1998 | Waskiewicz |
| 5,845,267 A | 12/1998 | Ronen |
| 5,907,677 A | 5/1999 | Glenn et al. |
| 6,013,107 A | 1/2000 | Blackshear et al. |
| 6,047,268 A | 4/2000 | Bartoli et al. |
| 6,076,078 A | 6/2000 | Camp et al. |
| 6,173,269 B1 | 1/2001 | Solokl et al. |
| 6,256,739 B1 | 7/2001 | Skopp et al. |
| 6,427,170 B1 | 7/2002 | Sitaraman et al. |
| 6,591,291 B1 | 7/2003 | Gabber et al. |
| 6,725,380 B1 | 4/2004 | Forlenza et al. |
| 6,742,036 B1 | 5/2004 | Das et al. |
| 6,772,214 B1 | 8/2004 | McClain et al. |
| 6,785,824 B1 | 8/2004 | Grassie |
| 2002/0049806 A1 | 4/2002 | Gatz et al. |

*Primary Examiner* — Ramsey Refai
(74) *Attorney, Agent, or Firm* — Peter K. Trzyna, Esq.

(57) ABSTRACT

A method of enabling a server to contact an unknown Internet account holder can begin with the server receiving a request for a resource. The server then determines whether the request for the resource warrants sending a notice, and if so, identifies a notice destination to which the notice is to be sent. The server then generates a notice comprising an apparent IP address, a time the server received the request, and a communication; and sends the notice to the notice destination via a standardized communications pathway. An ISP can receive a notice from the server via the standardized communication pathway, and based thereon can identify the account holder based the requesting IP and optionally the request time. The ISP can then send the account holder the communication by an arranged manner despite the server not having known the identity of the account holder.

20 Claims, 3 Drawing Sheets

METHOD AND SYSTEM TO ENABLE CONTACT WITH UNKNOWN INTERNET ACCOUNT HOLDERS

CROSS-REFERENCE TO RELATED APPLICATIONS

This application is a continuation from Ser. No. 09/901,947, filed Jul. 10, 2001 and claims the benefit from U.S. provisional application No. 60/217,077, filed Jul. 10, 2000, which are commonly owned and incorporated by reference herein.

FIELD OF THE INVENTION

The technical field of this invention relates to the Internet and like networks. In particular the present invention relates to the notification of Internet access account holders by servers that do not know the identity of the account holder.

BACKGROUND OF THE INVENTION

As Peter Steiner observed in a famous New Yorker cartoon, "On the Internet, Nobody Knows You Are A Dog." New Yorker, p. 61, Vol. 69, No. 20, Jul. 5, 1993. From the earliest days of the World Wide Web, anonymous usage has been the primary method for surfing the Web. Generally, Web surfers can visit a Web site without telling the Web site who they are. Instead, based on standard Internet protocols, the Web site (having a Web server) is told the surfer's IP address. The Web server just needs to know where the information is to be sent, not who the viewer is.

Often there is a third party facilitating the communications between a Web surfer and a Web server—an Internet Service Provider (ISP). An ISP may take on a variety of forms. It can be a standard commercial ISP, such as MSN or AMERICA ON LINE. An information technology department of a business may provide Internet access to the employees of the business and others. A home computer can host a LAN to share a DSL or cable modem line. For the purposes of this invention, an ISP is an intermediary that provides the routing of a message to a client computer system and can additionally provide other services such as e-mail, news, chat rooms, and the like.

Typically, the ISP uses one of two methods to map IP addresses to its users' computers—static IP addresses and dynamic IP addresses. Static IP addresses are permanently assigned to a user's computer. Even if the user's computer is only connected to the Internet for a few minutes each day, no one else uses the IP address assigned to that computer. Dynamic addresses are IP addresses that are placed in a pool by the ISP and assigned to users' computers on an as-needed basis. It is, therefore, possible that a single IP address will be used by a large number of computers in the course of a day. It is also possible that a single user who surfs the Web from a single computer, but in multiple sessions, in a single day would have a different IP address for each session. In addition, even if an ISP reliably identifies the computer from which a request comes, it has no way of knowing which individual is using the computer. It could be the person who set up the account with the ISP (the account holder), the spouse of the account holder, a child of the account holder, an employee of the account holder, or someone else who obtains access to the computer.

A variety of other existing conditions generally prevent a Web site from reliably ascertaining the identity of a user through the use of technologies, such as proxy servers. Among those, a proxy server discloses an IP address that may not be the IP address of the computer making the request of the server. When a proxy server is used, the Web server sends the Web page to the proxy server, and the proxy server, in turn, determines which computer has been assigned that IP address in order to send a page to the right computer. Therefore, even though the Web server does not know which computer has requested a Web page, it can use the knowledge that it has (an IP address) to send the page to the correct computer and depend on the proxy server to use the knowledge that it has (a correct mapping of IP addresses to its users' computers) to send the page to the correct computer. Also, a user may employ an anonymizing server to aid protecting the user's identity.

Further, even if a Web server knows who the current user of an account is, the Web server does not necessarily know who the account owner, the person responsible for the use of that account or who is responsible for supervising that account, is. For example, companies provide Internet access to their employees, and parents provide Internet access to their children.

Because a Web site cannot reliably depend on IP addresses to identify who a user is or even if a current user is the same person who visited a few minutes earlier, numerous techniques have been developed to identify users. The most well-known is a "cookie" that the Web site "plants" on the user's computer. A cookie is a small file that the Web site places on the user's computer that the Web site can find each time the user revisits the Web site. If the Web site finds a cookie that it planted in an earlier session, it knows that it is communicating with the same computer. Cookies are based on a "pull" technology, i.e., the Web site has no ability to contact the user, and it must wait for the user to visit it. Once the user visits the Web site, however, the Web site can read the cookie and instantly know which computer is communicating with it. However, cookies are less than foolproof because people can access an account from a friend's computer using their own account username and password and thereby make repeatable, reliable identification of a user problematic.

Another technique is to ask the user for the user's email address. Possession of a user's email address allows the Web site to use "push" technology to contact a user, i.e., the Web site can, without waiting for the user to visit the site, contact the user. Unfortunately, mere possession of a user's email address does not help the Web site identify the user the next time that the user comes to the site. In addition, many users supply false email addresses or supply email addresses acquired from free Web-based email services that they seldom, if ever, check. Also, in any case in which multiple users access a single computer and use a single email address, possession of an email address does not allow the Web site to contact a particular person.

Another technique is the use of passwords. By requiring a user to supply a password each time the user visits a site, the Web site can assume with reasonable certainty that it is dealing with the same person to whom it issued the password in an earlier session. Like cookies, passwords are a "pull" technology and not a "push" technology.

Although combinations of the above-described technologies can achieve a number of the user's and the Web site's needs, they have not solved some vexing problems. For example, Web sites catering to children now need to verify children's ages and, in some cases, need to obtain parental consent, such as under. The Child Privacy Protection Act. Since children do not necessarily want their parents to know what they are doing on the Internet, they have found ways to defeat current parental notification and consent mechanisms.

For example, if a Web site asks for a parent's email address, the child can create his or her own address and give it to the Web site as if it were a parent's email address. Any subsequent communications from the Web site to the parent would in fact be sent to the child. Although some procedures have been crafted to deal with this issue, they are either cumbersome or unreliable.

Another example is a teenager looking for pornography. Even if a Web site is willing to restrict access to adults, it has no practical way to distinguish between child and adult users (especially when the child does not want to be found out). The two basic solutions are to implement a registration system that enables someone to prove in advance that he or she is eighteen years old or older or to depend on the parents of the child user to purchase and install filtering software). None of the registration systems proposed to date have passed constitutional muster. Therefore, none of the burden of policing porn surfing by children currently rests with the porn site.

Therefore, it is desirous to find a solution to the deficiencies of the current systems. Desirably such a solution would implement a method to enable Web sites and other servers to reliably contact account holders without requiring the account holder to tell the Web site who the account holder is. Desirably such a system would distinguish between the user of the account and the person responsible for the account.

BRIEF SUMMARY OF THE INVENTION

One aspect of the present invention is a method of enabling a server to contact an unknown Internet account holder comprising the steps of:

receiving a notice from the server via a standardized communication pathway, the notice comprising a request time and a requesting IP address, and a communication;

identifying the account holder based the requesting IP address and optionally the request time; and sending the account holder the communication by an arranged manner;

wherein the server need not know the identity of the account holder, and the notice need not contain information regarding the identity of the account holder.

In another embodiment of the present invention identifying the account holder comprises checking a list of static IP addresses.

In a further embodiment of the invention the arranged manner is selected from the group consisting of email, fax, voice, standard mail and destruction.

In yet another embodiment of the present invention, the standardized communication pathway is email, the step of identifying the account holder comprises checking one or more files comprising a database comprising dynamic IP addresses, accounts, and times, and the request time is the time at which the server received the request.

Still another embodiment of the present invention, is for use in an environment where a proxy server is provided and the IP address received from the server as part of the notice is deemed to be a disclosed IP address. Such an embodiment checks a proxy IP address database comprising disclosed IP addresses, assigned IP addresses, and proxy assignment times, identifies the assigned IP address associated with the disclosed IP address at the request time, and modifies the communication to reflect the assigned IP address wherein the assigned IP address used by the client computer system is reflected in the email.

Another aspect of the present invention is a method of enabling a server to contact an unknown Internet account holder comprising the steps of:

receiving a request for a resource;

determining that the request for the resource warrants sending a notice;

identifying a notice destination to which the notice is to be sent;

generating a notice comprising an apparent IP address, a time the server received the request, and a communication; and sending the notice to the notice destination via a standardized communications pathway.

Another embodiment of the present invention comprises the step of warning a user that fulfilling the request for the resource will result in the sending of a notice.

In yet another aspect of the present invention the server is a Web server that is sending a response to a hypertext transfer protocol request.

In still another aspect of the present invention the response to the hypertext transfer protocol request contains hypertext code that aids in preventing the caching of the Web page.

In an alternative embodiment of the present invention the hypertext transfer protocol request contains hypertext code that enables a caching server to send notices on behalf of the server.

Another aspect of the present invention is a system for enabling a server to contact an unknown Internet account holder comprising:

means for receiving a notice from the server via a standardized communication pathway, the notice comprising a request time and a requesting IP address, and a communication;

means for identifying the account holder based on the requesting IP address and optionally the request time; and means for sending the account holder the communication by an arranged manner;

wherein the server need not know the identity of the account holder, and the notice need not contain information regarding the identity of the account holder.

In another aspect of the present invention the means for identifying the account holder comprises a list of static IP addresses.

In yet another aspect of the present invention the means for sending is selected from the group consisting of email, fax, voice, standard mail and destruction.

In a still further aspect of the present invention, the standardized communication pathway is email, the means for identifying the account holder comprises a database comprising dynamic IP addresses, accounts, and times.

Another aspect of the present invention is for use in an environment where means for assigning apparent IP addresses is provided and the IP address received from the server as part of the notice is deemed to be an apparent IP address, further comprising:

means for checking an apparent IP address database comprising disclosed IP addresses, assigned IP addresses, and proxy assignment times;

means for identifying the assigned IP address associated with the apparent IP address at the request time;

means modifying the communication to reflect the assigned IP address;

wherein the assigned IP address used by the client computer system is reflected in the communication to the account holder.

Another aspect of the present invention is a system for enabling means for serving a resource to contact an unknown Internet account holder comprising:

means for receiving a request for the resource;

means for determining that the request for the resource warrants sending a notice;

means for identifying a notice destination to which the notice is to be sent;

means for generating a notice comprising an apparent IP address, a time the server received the request, and a communication;

means for sending the notice to the notice destination via standardized communications pathway means.

An alternate embodiment of the present invention comprises means for warning a user that fulfilling the request for the resource will result in the sending of a notice.

Another aspect of the present invention is a system for enabling a server to contact an unknown Internet account holder comprising:

a standardized communications pathway server capable of receiving a notice;

a parser capable of identifying a request time, a requesting IP from the notice and a communication within the notice;

a login database comprising IP addresses, request times, and accounts; and account holder communication subsystem for sending the account holder the communication;

wherein the server need not know the identity of the account holder, and the notice need not contain information regarding the identity of the account holder.

In another embodiment of the present invention, the login database comprises a list of static IP addresses.

In yet another embodiment of the present invention, the account holder communication subsystem is selected from the group consisting of email, fax, voice, standard mail and destruction.

In still another embodiment of the present invention, the standardized communication pathway server is an email server, and the login database comprises dynamic IP addresses, accounts, and times.

A further alternative embodiment of the present invention is for use in an environment where a proxy server is provided and the IP address received from the server as part of the notice is deemed to be an apparent IP address, further comprising:

an apparent IP address database comprising disclosed IP addresses, assigned IP addresses, and assignment times for the disclosed IP addresses;

software that identifies the assigned IP address associated with the apparent IP address at the request time;

software that modifies the communication to reflect the assigned IP address;

wherein the assigned IP address used by the client computer system is reflected in communication to the account holder.

Another aspect of the present invention concerns a system for enabling a server to contact an unknown Internet account holder comprising:

a server to receive a request for a resource;

software to determine that the request for the resource warrants sending a notice;

software to identify a notice destination to which the notice is to be sent;

software to generate a notice comprising an apparent IP address, a time the server received the request, and a communication; and a standardized communications pathway server to send the notice to the notice destination.

A further embodiment of the present invention comprises software for warning a user that fulfilling the request for the resource will result in the sending of a notice.

In another embodiment of the present invention the resource is a hypertext transfer protocol resource.

Other features and advantages of the present invention will be apparent to those skilled in the art from the following detailed description, the accompanying drawings and the appended claims.

BRIEF DESCRIPTION OF THE DRAWINGS

The benefits and advantages of the present invention will become more readily apparent to those of ordinary skill in the relevant art after reviewing the following detailed description and accompany drawings, wherein.

DETAILED DESCRIPTION OF THE INVENTION

Figure 1:
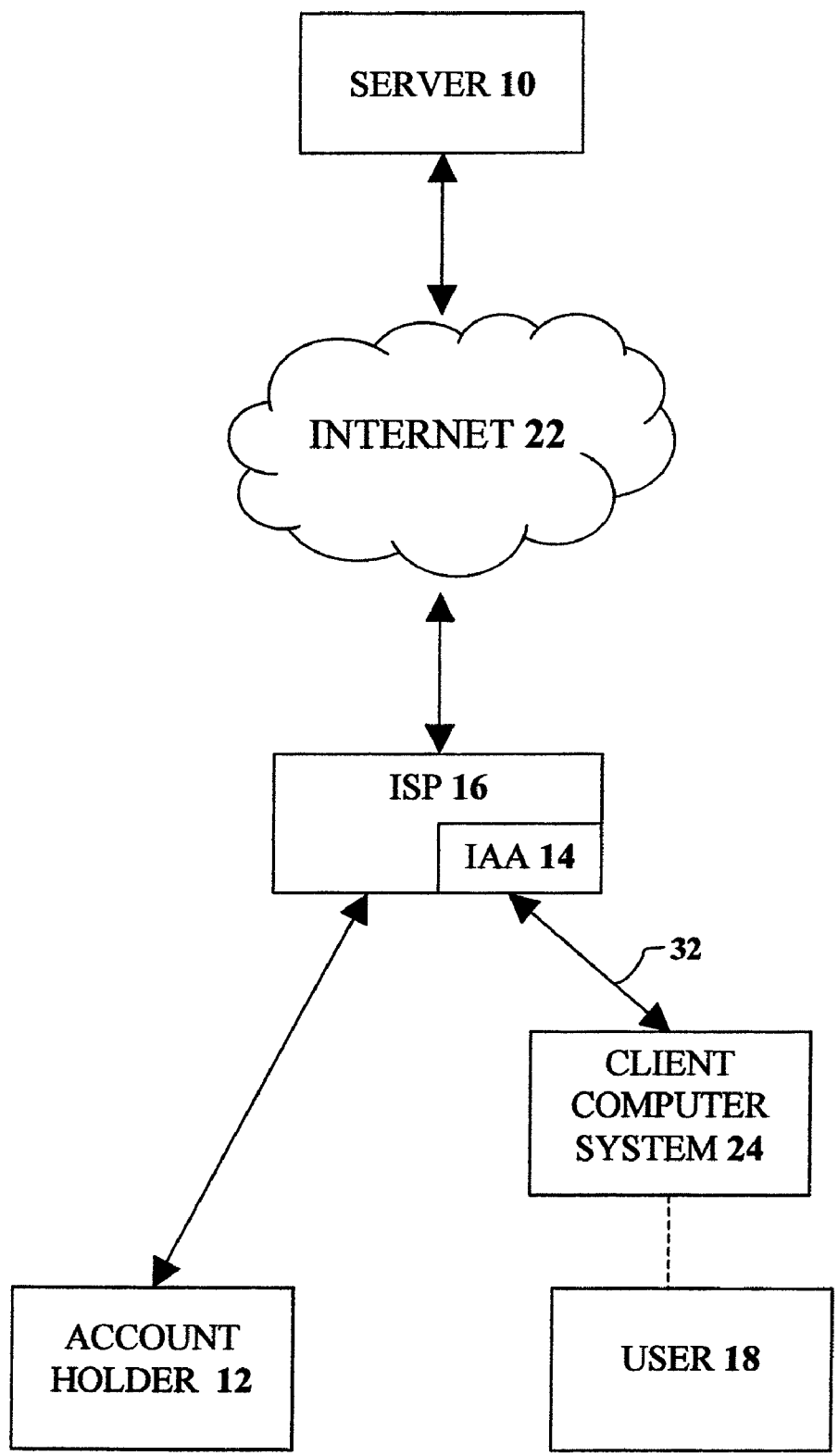
FIG. 1 illustrates the relationship of the systems of the present invention.

In this written description, the use of the disjunctive is intended to include the conjunctive. The use of definite or indefinite articles is not intended to indicate cardinality. In particular, a reference to "the" object or thing or "an" objection or "a" thing is intended to also describe a plurality of such objects or things.

It is to be further understood that the title of this section of the specification, namely, "Detailed Description of the Invention" relates to a requirement of the United States Patent and Trademark Office, and is not intended to, does not imply, nor should be inferred to limit the subject matter disclosed herein or the scope of the invention.

Although the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring to the figures, and in particular to FIG. 1, the present invention is directed to systems and methods by which a server 10 can contact an account holder 12 of an Internet access account (IAA) 14 on an ISP 16 being used by a user 18 making a request 20 from the server 10. The server 10 is a server on a network 22, such as the Internet (and such should be treated as synonymous for this invention). The ISP 16 is connected to the same network 22. A client computer system 24 is connected to the ISP 16 as permitted by the Internet access account 14 established or supervised with the ISP 16 by the account holder 12. The user 18 through his client computer system (or "client") 24, the ISP 16, and the network 22 can make requests 20 of the server 10. The server 10 can send responses 26 to the user 18 through the network 22, the ISP 16, and the client computer system.

The server 10 manages requests 20 for resources 28 from computer client systems 24. For the purposes of this invention, the resource 28 is any information, file, or service provided by the server 10 to a client. The server 10 can be a Web server, in which case the resources 28 requested are Web pages, and the requests 20 and responses 26 are done according to hypertext transfer protocol (abbreviated HTTP). The Web server 10 can be hosted on any number of hardware computing platforms (computers) known to those of ordinary skill in the art. A Web server 10 can also use a wide variety of software as appropriate for the operating system selected.

Thus, UNIX systems can use APACHE or NETSCAPE, a NOVELL Web server can use NETWARE WEB SERVER (such as is included with INTRANETWARE), a WINDOWS NT system can use INTERNET INFORMATION SERVER, or a MACINTOSH system can use APPLESHARE IP 6, MACHTTP, or WEB-STAR. The server 10 can also be an FTP (file transfer protocol) server that provides files, a news server (often using NNTP, but possibly a product such as DNEWS) that provides news service (such as USENET news), or a chat server (such as an IRC server) that provides a series of messages. A server 10 can even serve interactive sessions hosted by TELNET and the like.

The ISP 16 is an entity that provides access to the network 22. The ISP 16 can provide access to the Internet 22 via a variety of communications paths, including, but not limited to, dial-up modems, cable modems, ISDN (integrated services digital network 22) modems, DSL (digital subscriber line) modems, LANs, Ethernet connections, and even wireless connections including, but not limited to, satellite dishes. Software for managing access to the ISP 16 varies with the communication path chosen. When a dial-up modem is used, Point-to-Point protocol (PPP) can be used, but other methods such as Serial Line Internet Protocol (SLIP) and others can also be used. As will be appreciated by those skilled in the art, a wide variety of hardware and software can be used to accomplish the connection of ISPs 16 to clients 24, and all such forms of connection are contemplated by the present invention.

Typically, the ISP 16 will provide access to the Internet 22 in exchange for remuneration, but some fee-free ISPs 16 exist. Examples of ISPs 16 include, but are not limited to, AOL, MSN, EARTHLINK, UNITED ONLINE, AT&T WORLDNET, COMPUSERVE, PRODIGY and the like. The technical offerings of ISPs 16 vary, but the fundamental task of an ISP 16 is to provide access to the Internet 22. In doing so, the ISP 16 provides the routers and other equipment necessary for the client to communicate with the Internet. ISPs can provide services such as domain name resolution, email accounts, Web servers, USENET news access, chat servers, and more.

The ISP 16 manages its Internet 22 access via accounts 14. The ISP 16 can define an account 14 by a username that tracks the usage of the account 14 and assures that a given connection is a usage of the ISPs 16 resources 28 authorized by the ISP 16. To limit the use of the account 14 to authorized uses, an ISP 16 will ordinarily assign a password associated with the user 18 name. For example, the ISP 16 may allow only one connection to its system using a particular user 18 name at a time, or may only permit the account 14 to be used during certain hours or for a certain amount of time each month. The ISP 16 can also use the account 14 to monitor usage for billing purposes. For example an ISP 16 could bill the account holder 12 based on the bandwidth used, the amount of time the account 14 is active, a combination of those, or other factors that the ISP 16 desires and to which the account holder 12 agrees.

The account 14 can be configured for use by several users 18. For example, AOL permits one "account 14" to have multiple user 18 names and email addresses so that an entire family can share a single account 14, although only one user 18 can be logged in at a time. Another example would be a LINUX system that permits multiple users 18 to access the Internet 22 via a single PPP connection. Any number of ISPs 16 support multiple email addresses per account 14, for example AMERITECH's SPEEDPATH 768 (www.ameritech.net) provides one Internet 22 connection with five (5) email accounts. The present invention contemplates either single or multiple users 18 per Internet access account 14 whether the users 18 are defined by the ISP 16 or the account holder 12.

The account holder 12 is a person or entity responsible for the Internet access account 14, and can be responsible for payment, use, or the like. The account holder 12 can be the same as the user 18 of the account 14. Alternatively, the account holder 12 can be a different person or entity. For example, a user 18 could also be one of the parent's children, but the parent would still be the account holder 12. The user 18 can be an employee of a company, and the account holder 12 would the company, exercising its prerogatives as an account holder 12 through supervisory employees of the company.

Users 18, whether the account holder 12 or someone or something else, use a client computer system 24 to access the ISP 16 and the Internet 22. A client computer system 24 is hardware, firmware and/or software appropriate for accessing the ISP 16 and the Internet 22 and whatever servers on the Internet 22 as desired. The client computer system 24 is not necessarily a single fixed system for any given Internet access account 14. First, multiple client computer systems 24 can be used to access a single account 14. For example, a home system can have several computers in the home, each of which accesses the same Internet access account 14, albeit not necessarily simultaneously. Second, for national ISPs 16, such as AOL and MSN, a vacationer could still access his Internet access account 14 from any properly equipped computer. As will be evident to those of ordinary skill in the art, the present invention is not necessarily tied to a particular computer.

The hardware for a client computer system 24 can be a general purpose "PC" system running client computer operating system software such as WINDOWS 98 or the like from Microsoft Corp. of Redmond, Wash., RED HAT LINUX of Durham, N.C., OS/X from Apple Computer of Cupertino, Calif., or the like. Possible Web client software includes, but is not limited to NETSCAPE NAVIGATOR, or MICROSOFT INTERNET EXPLORER (IE). The client computer system 24 can also be a personal digital assistant configured for Internet access, such as a PALM VII and the like or even a cellular phone such as a KYOCERA SMARTPHONE and the like. The client computer system 24 could also be a television receiver system, such as ULTIMATE TV from DIRECTV (see www.directv.com) or STARBAND from DISHNETWORK 22 (see www.disknetwork.com). A client computer system 24 does not necessarily have only one user 18 at a time. For example a LINUX system can serve a LAN, or have multiple X-Windows terminals or serial login sessions.

A user 18 is an entity that is using the Internet access account 14 via the client computer system 24 at any given time. The user 18 can be a person or even a computer program such as an automated agent. Even if the user 18 is a person, the user 18 can be different people at different times.

For example, Mr. Smith can have a computer equipped with software and an account 14 for his family with AMERICAN ONLINE (AOL). Tracy, Mr. Smith's child, can use the account 14 to make access YAHOO!'s services via AOL. YAHOO! is the server (site) 10, AOL is the ISP 16, and the computer 24 with the software is the client. Mr. Smith is the account holder 12, and Tracy is the user 18. Another example would be for an employee to access Yahoo.com from his desktop computer via his company's Internet access service, which can be monitored by the information services department. In that example, YAHOO! is again the server 10, the company's Internet access service is the ISP 16, the employee is the user 18, the desktop computer is the client, and the information services department is the account holder 12. Numerous variations on these theme will be apparent to those of ordinary skill in the art and are contemplated by the present invention.

Figure 2:
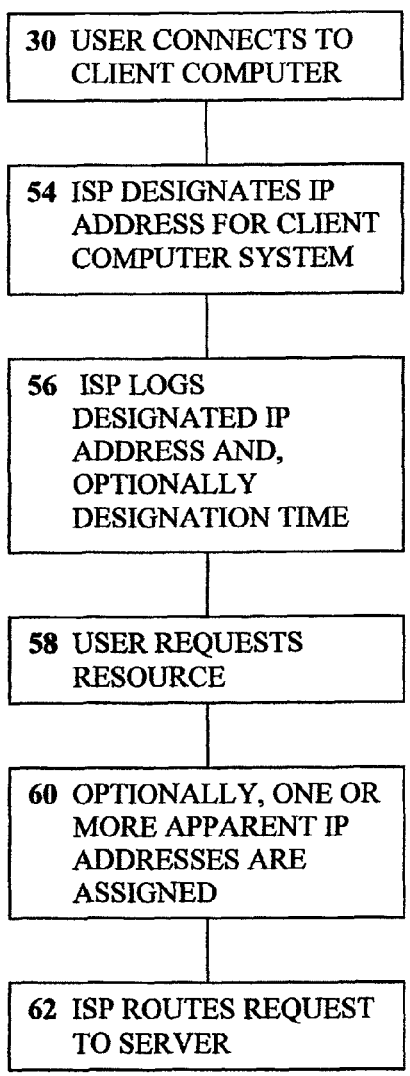
FIG. 2 is a flowchart illustrating a process and system by which a user sends a request to a server.

Referring to FIG. 2, a user 18 connects 30 the client computer system 24 to the ISP 16 by designating the Internet access account 14. For the purpose of this invention connecting a client computer system 24 involves establishing the ISP 16 as an effective pathway 32 between the server 10 and the client computer system 24, and can comprise any or none of authorization, authentication, assignment of an IP address 34, assignment of a router, and the like. The client computer system's 24 login process can be automated by a script, or the user 18 can manually enter the information necessary to log in, such as a username and password and the like. For dial-up modem systems, this can comprise establishing a PPP connection with the ISP 16. For DSL or cable-modem systems, establishing an effective pathway 32 may not be necessary often as these are "always-on" technologies. For dedicated connections such as T-1 lines accessed via a corporate LAN, logging the client computer system 24 into the LAN may be sufficient.

The ISP 16, using standard techniques known to those of ordinary skill in the art, designates 54 an IP address 34 for the client computer system 24 and establishes communication with the client computer system 24. For the purposes of this invention, the IP address 34 of the client computer system 24 can be either a static IP address 44 or a dynamic IP address 48. The ISP 16 can use DCHP, BOOTP or other protocols for negotiating the assignment of the IP address 34 with the client computer system 24. For an Internet access account 14 or a client computer system 24 having a static IP address 44, the ISP 16 need not assign or designate 54 a dynamic IP address 48. The IP address 34 of the client computer system 24 can be, but is not necessarily, masked by a proxy server 36. Further, the ISP 16 can establish an apparent IP address 37, possibly using a firewall or proxy server 36, that the ISP 16 will use for communications with the Internet 22. It is also possible that anonymizing servers 38 can be used providing additional layers of apparent IP addresses 37. A designation time 42 is the time at which the ISP 16 designates 54 the IP address for the client computer system 24, whether actual 34 or apparent 37. Each IP address 34, 37, whether actual or apparent, designated by the ISP 16 can have a designation time 42.

For client computer systems 24 having static IP addresses 44, the ISP 16 can maintain a static IP address database 46 of client computer systems 24 and IP addresses 34. The client computer systems 24 can be identified by various means known to those skilled in the art, including but not limited to tracking the Ethernet identity of an Ethernet card. Alternatively, for client computer systems 24 having dynamic IP addresses 48, the ISP 16 can log 56 the time of the allocation of the IP address (designation time), the Internet access account 14 being used and the IP address 34 allocated to the client computer system 24. Associating a given client computer system 24 with a static IP address 44 is a straightforward task for those of ordinary skill in the art, and will not be discussed here.

In logging 56 the designation time 42, account 14, and IP address 34, the ISP 16 can use standard log files 50 for the servers used to log the client computer system 24 in. Such log files 50, singly or in combination, can comprise a login database 52. The login database 52 can also be created independently of the server log files 50 and maintained by the ISP 16 via any number of flat file, relational, or other database programs. Such file can be maintained solely for the purpose of implementing the invention or can be applied to other purposes. For example, such a database can be used to re-establish dropped connections to a client computer system 24 with an identical IP address 34. See U.S. Pat. No. 5,812,819.

In one method of the present invention, the user 18 requests 58 a resource 28 from the server 10 using the client computer system 24. It will be understood by those of ordinary skill in the art that the actual request 20 for a resource 28 may have preceded the user 18 connecting the client computer system 24 to the ISP 16 and triggered the connection to the ISP 16 via an automatic connection mechanism, such as present in WINDOWS 98 connection manager. Various technicalities, such as the resolution of URLs and domain names, are well understood by those of ordinary skill in the art and are not an inventive aspect of the present invention. Those of ordinary skill in the art will understand how such tasks are accomplished, usually by the ISP 16, to route the user's 18 request 20 to the server 10.

The request 20 may be routed 62 directly to the server 10 by the ISP 16, or may be routed 62 indirectly through multiple routers and/or routing computers including third-party anonymizing services 38 such as provided by ZEROKNOWLEGE (www.zeroknowledge.com) among others. In one embodiment, the request 20 for a resource 28 can be a request 20 for a Web page from a Web server 10 using a Web browser. The ISP 16 and or other third parties, such as anonymizing servers 38, may each assign 60 an apparent IP address 37 to the IP address that it received from the previous stage in the process. Each of these entities assigning 60 an IP address is an ISP 16 for the purposes of this invention, and can perform the logging 56 of apparent IP addresses 40 and the designation times 42 of those apparent IP addresses 40.

Figure 3:
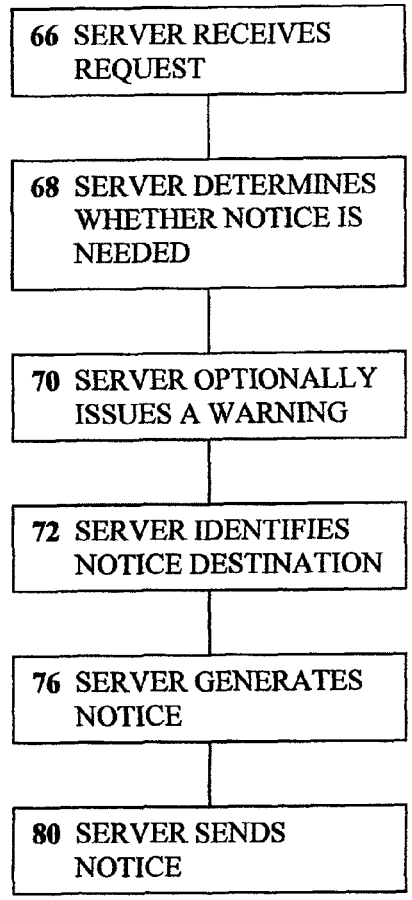
FIG. 3 is a flowchart illustrating a process and system by which a server sends a notice to an account holder.

Referring to FIG. 3, the present invention contemplates systems and methods in which the server 10 receives a request 20 from the user 18 for a resource 28 and, in addition to the response 26 to the user 18, generates a notice 64 to the account holder 12 of the request 20. The notice 64 may be generated for a variety of reasons. First, regulations or statutes may require the operator of the server 10 to notify the account holder 12 of certain activity. As one example various commercial or moral child protection acts can require operators to contact parents regarding transactions proposed by children. Second, the operator of the server 10, in order to maintain a good commercial reputation or in good conscience can voluntarily decide to provide notices 64 as appropriate. For example, despite its entry into the adult content market, YAHOO! could decide to provide notices 64 voluntarily to account holders 12, even though it may not be required to do so by law in order to facilitate good public relations.

Still referring to FIG. 3, the server 10 receives 66 a request 20. After receiving 66 the request 20, the server 10 determines whether the server 10 needs to generate a notice 64 in order to provide the requested resource 28, and what notice 64 is appropriate for the particular resource 28. Examples of resource 28 content that could require notification of an account holder 12 are: pornographic material, hate material, material outlawed in particular countries (for example material critical of the Chinese government), and material soliciting the private information of minors (per The Children's Online Privacy Protection Act).

The code for determining a need for (or triggering) the generation of a notice 64 can be located in the resource 28 requested, in the server 10 itself, or in a database accessed by the server 10. For example, a Web page can contain code to generate the notice 64 or call a program to generate the notice 64 when it is accessed by the server 10. For example, Active Server Pages can be used to provide Web pages while simultaneously generating a notice 64. Alternatively, the Web server 10 itself can be programmed to trigger the generation of the same notice 64 for all Web pages it serves. In another alternative, the Web server 10 can use a database, whether incorporated into the Web server 10 or in a separate application or file, to trigger the generation the notice 64.

Another embodiment of the present invention is embodied in an FTP server 10. For example, an FTP server 10 (FTPD) at a pornographic site could be programmed to generate an identical notification message with each and every file transfer. A third example would be an NNTP server 10 that accesses a database individual to the Internet access account 14 and generates notices 64 in accordance with that database. Such a database could be generated by the ISP 16, or could even be generated in cooperation with the account holder 12. Notices 64 can be generated only for selected newsgroups and or for all newsgroups.

Optionally, if a notice 64 is in order, the server 10 issues 70 a warning to the user 18 that proceeding will result in a notice 64 being sent to the account holder 12, allowing the user 18 to abort the request 20. In the embodiment of the invention directed to Web servers 10, tracking whether the warning has been issued 70 can be handled via cookies, having a link to a purported content page lead instead to a warning page that actually presents a content page, via a pop-up window with response-accepting widgets, and other methods known to those of ordinary skill in the art.

If and when the server 10 continues to process the request 20, the server 10 identifies 72 a notice destination 74 that the notice 64 is to be sent to. Preferably, the server 10 identifies the notice destination 74 that the notice 64 is to be sent to by performing a reverse domain name lookup based on the IP address of the requesting computer system (whether client 24, ISP 16, anonymizer or other source) to generate a domain name. Optionally, if a domain name lookup fails, the notice 64 can be sent directly to the requesting computer system or abandoned.

In embodiments of the present invention regarding Web servers 10, it is preferred that Web pages responsive to requests 20 for HTML 1.1 and higher HTML code that trigger 68 the generation of a notice 64 utilize "cache-control" hypertext protocol headers as described in RFC 2068 (available at www.itef.org) and later updates of the same. Headers of the form: HTTP header: cache-control: no-cache can aid in preventing content from being cached by either ISPs or local computers Request 20s for HTML 1.0 code and higher can use HTML meta-tags. Meta tags such as HTTP-EQUIV="Pragma", CONTENT="no-cache", or can set HTTP-EQUIV="Expires", CONTENT="0" can also be used to aid in preventing caching by servers not equipped to or not having sufficient data to generate appropriate notices 64. Analogous technologies can be applied for non-Web servers 10 to prevent access of material that should generate a notice 64 from servers 10 that are not equipped to properly generate notices 64.

Optionally, a meta-tag for "Notice" with the content of the tag being the communication appropriate for the Web page be included in the headers. In such an embodiment, caching intermediates, such as used by AOL and others, can generate appropriate notices 64 from cached copies of the Web page. Alternatively, the server can make information for notices available via a public database. Such a publicly available database can be implemented in a variety of ways including specialized servers, Web servers, ftp servers, and other remote data access methods known to those of ordinary skill in the art.

The server 10 can generate 76 the notice 64. It should be noted that although it is preferred for the server 10 to generate 76 the notice 64 after attempting to identify 72 a notice destination 74, such is not necessary. The notice 64 comprises: 1) the apparent IP address 37 of the client computer system 24; 2) the time and date that the server 10 received the request 20; and 3) the communication 78 that the server 10 desires to impart to the account holder 12. The apparent IP address 37 of the client computer system 24 is the IP address to which the server 10 will send the requested resource 28. The apparent IP address 37 can be, but is not necessarily, the actual IP address 34 of the client computer system 24. As discussed above, proxy servers 36 and or anonymizing servers 38 may be in use, so the server 10 does not know if the IP address is the actual IP address 34 of the final destination. The time and date include time zone so that an offset can be applied to reconcile the time of the notice 64 with the local time of the eventual interpretation of the notice 64.

Preferably, the notice 64 contains a line such as the following: "To user of xxx.xxx.xxx.xxx at 12:01:45 GMT on Dec. 13, 1999". The text could be any communication that the Web site 10 wanted to send. For example, "Someone using your computer on Dec. 13, 1999 at 12:01:45 visited a sexually explicit site". Or, "Someone identifying himself as a 15 year old named Joe Jones has asked to become a Pen Pal Club member. If you are Joe's parent or legal guardian, please complete and submit the attached questionnaire to give him permission to join." In response a person can provide information confirming responsibility for the account or named individual. The information confirming responsibility can be in a variety of means known to those of ordinary skill in the art including digital certificates, credit card numbers, and the like or through the provision of verifiable contact information through other media such as postal addresses, phone numbers and the like.

The server 10 then sends 80 the notice 64 to the notice destination 74 via a standardized communications pathway 82. The standardized communications pathway 82 is preferably email. The notice destination can be the ISP 16 or can be an anonymizer or other entity.

A sample Perl script for identifying 72 a notice destination 74 and generating 76 and sending 80 such a notice 64 is provided in Appendix A. A header (lines 1-5) is followed by the designation of the locations of various files including the program for sending mail (lines 9-11). A time offset portion, assuming a computer 4 hours from GMT is included at line 19, and the time is obtained at lines 24-25. The remote IP address and remote host are obtained as environment variables. (lines 26-27) The program checks whether a notice 64 has already been sent. (line 32) If a domain name to be mailed cannot be obtained (as understood by those of ordinary skill in the art, the address of SMTP servers serving a particular domain are normally obtained via the DNS system) the script chooses not to send the notice 64. (line 37). The present invention is not limited to resolved IP addresses, however. The numerical IP address can be enclosed in square brackets [xxx.xxx.xxx.xxx] and the notice 64 sent to that IP address. The script then limits sending notices 64 to destination having international top level domains and the U.S. national domain. (lines 40-51) However, the invention is not limited to existing TLDs or this country. The subroutine mail is then called. (line 52)

The mail subroutine (lines 66-72) calls the sendmail subroutine (lines 74-89) to compose the email message and sends it to the mail sending program (lines 75 and 89). In this example the server 10 is sending a neutral message to the account holder 12 from "explained.com."

A routing recipient, such as an ISP 16 or anonymizer server 38, at the notice destination 72 may implement the present invention for a variety of reasons. First, it may be required to do so pursuant to regulation or statute. Second, the notice destination 72 may decide that in order to maintain a good commercial reputation that the receipt and management of these notices 64 is appropriate. For example, a family-friendly ISP 16 could decide to differentiate itself from other ISPs 16 by providing the benefits of this invention. Another example would be an anonymizer 38 such as ZEROKNOWL-EDGE that is employed by the account holder 12 on the condition that it forward such notices 64. Upon receipt of the notice 64, the notice destination 72 either identifies another notice destination 72 (in the case of an anonymizer 38 and the like) or identifies the account holder 12 to whom the notice 64 is directed (in the case of the ISP 16), and forwards the notice 64 to the account holder 12.

Figure 4:
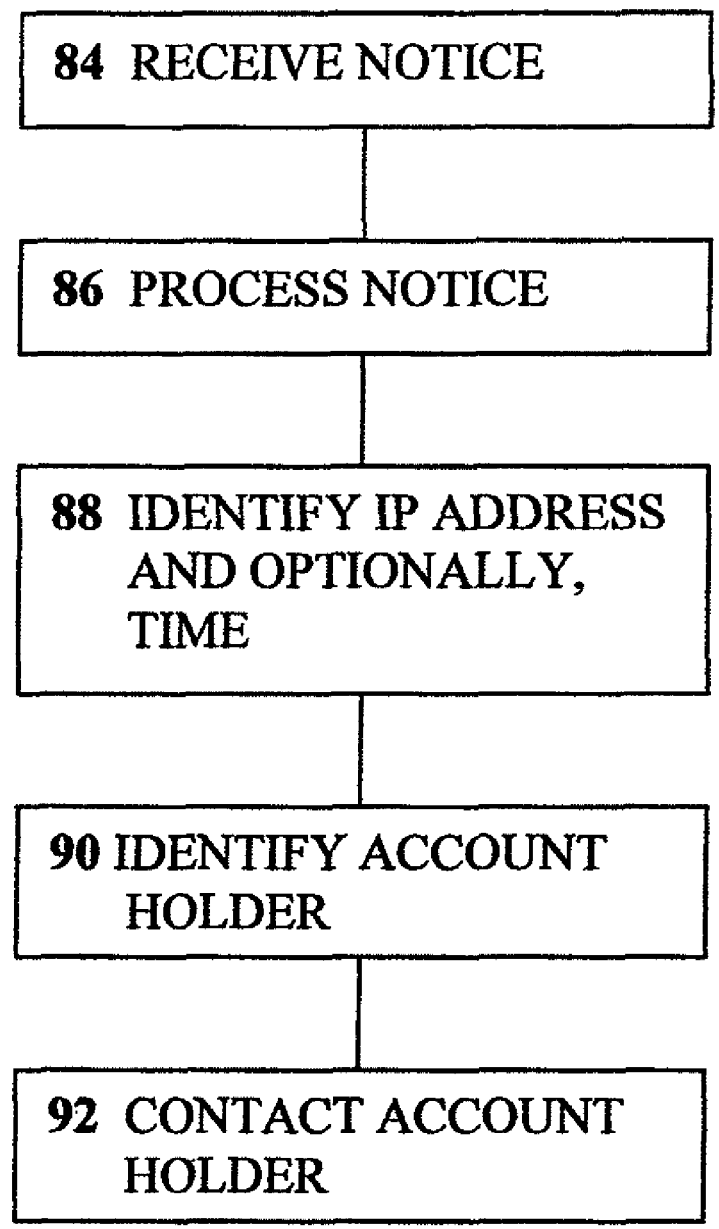
FIG. 4 is a flowchart illustrating a process and system by which an ISP delivers a notice to an account holder.

Referring to FIG. 4, in a simple embodiment of the invention, the server 10 sends the notice 64 to the ISP 16. The ISP 16 receives 84 the notice 64 from the standardized communications pathway 82. The ISP 16 then processes 86 the notice. In an embodiment where the standardized communications pathway 82 is email, the receiving mail (often SMTP) server can process the notice by searching the recipient field to determine the requesting IP address contained in the notice 64. A preferred simple method is to have the IP address be the designated recipient as part of the email address such as xxx.xxx.xxx.xxx@DOMAIN. For situations where a notice 64 is being forwarded, the forwarding entity can substitute a new recipient for the email address using the same information that would be used to forward the response 26 from the server 10 to the request 20, constituting a new destination IP address.

The ISP 16 can provide software for processing 86 incoming email for every IP address that can be used by account holder 12 desiring to receive 84 notices 64. Generally, this will be the static IP addresses 44 of accounts 14 desiring to receive notices 64 and all possible dynamic IP addresses 48. Upon receipt of the email, the ISP's 16 mail system would send the notice 64 to its "ipaddress" processing 86 software or "ipaddress" mailbox or mailboxes. Using manual or automatic techniques well known to those of ordinary skill in the art, the content of the email message can be processed (synonymous here with parsed) to separate the IP address 34, and the time.

If the IP address 34 is a static IP address 44, the ISP 16 would know the account holder 12 to whom to message should be delivered. If the IP address is a dynamic address 48, the ISP 16 can identify 88 the IP address 34 by querying the login database 52 or scanning and/or parsing the appropriate log files or other means that uses date and time stamping techniques to keep track of IP address assignments. The login database 52 can then be queried to determine which account 14 is associated with the IP address 34 on the specified day and at the specified time. It should be noted that just because a particular account 14 or client computer system 24 ordinarily used by an account 14 has a static IP address 44, an ISP 16 can permit multiple logins or logins from other than a dedicated client computer system 24 to use dynamic IP addresses 48.

If a proxy server 36 is used, the ISP 16 refers to the appropriate logs and determines the IP address 34 that the apparent IP address 37 is associated with. In any event, the ISP 16 can refer to the login database 52 to identify 88 the Internet access account 14 associated with the destination address and proxies thereof.

Once the Internet access account 14 is identified 88, the account holder 12 can be identified 90 by manually or automatically referring to information on the Internet access account 14. Once the account holder 12 is identified, the ISP 16 can contact 92 the account holder 12 in any manner that the ISP 16 and the account holder 12 have previously arranged or that they arrange in the future, such manner comprising an account holder 12 communication subsystem.

For example, one arranged manner, perhaps the default, can be to simply destroy the email message if the account holder 12 is not to receive notices 64. This can be the case if the user 18 is an adult living alone and is capable of preventing anyone else from using his or her computer. Such an account holder 12 could have no interest in being told that he or she made a request 20 of a particular server 10. Another arranged manner would be to give the Web site an email address to which only the account holder 12 has access (e.g., a free email account 14). The ISP 16 could also send the notice 64 to an account holder 12's email account 14 with the ISP 16. Other alternatives can include sending a printout to the account holder's 12 address, a telephone number via fax print, a telephone number for an oral communications (preferably automated), or a work email address to which a general notification could be sent.

Because the overwhelming majority of Internet access accounts 14 are paid for by credit card, virtually no child is the account holder 12 for a paid ISP 16 account 14. If a child accesses the Internet 22 from a computer at home, in almost every case the account holder 12 will be the parent of the child, a guardian of the child or someone who has a relationship with a parent or guardian of the child. Therefore, a communication with the account holder 12 will effectively be a communication with the parent or guardian of the child. Similarly, almost no employees pay for the Internet access accounts 14 they use at work—those are paid for and maintained by the employer. Therefore, a communication to the account holder 12 of an employee's account 14 will the employer.

Using the present invention, a pornography site can warn every user 18 that it will notify the account holder 12 if a particular page is viewed and can send the appropriate email if a user 18 chooses to view the page in question. This approach is akin to requiring a teenage boy who looks at a *Playboy* magazine at home to leave it on the kitchen table before he goes to school rather than hiding it in his closet. In most cases this would be an effective deterrent to children who want to visit pornography sites. The approach will also be quite effective for employers who are concerned about improper employee use of the Internet 22.

In addition, a site that would want to reliably notify a parent about a child's use of the site could notify the account holder 12 (typically the parent) directly. If the site wants to get parental permission, it could do so by contacting the account holder 12 and asking the account holder 12 to verify that he or she is the parent and to return a permission slip or to forward the communication and the permission slip to the parent. Since the child will not have access to the communication with the account holder 12, it is feasible to put a password or other security device in the email so that the parent can communicate later on a secure basis. In fact, the Web site can set up a separate communications channel that can only be accessed by someone with the password (or other security device). This is desirably for commercial sites that have concerns about proper notification under The Children's Online Privacy Protection Rule Similar arrangements could be implemented for other uses of the Internet 22. For example, newsgroups are another way in which pornographic materials are distributed over the Internet 22. Information posted on newsgroups is not delivered to users 18 in the same way that information is delivered to users 18 on the Web. In the case of the Web, information is housed on a computer controlled by the provider of the information. For example, if a page request 20 is sent to whitehouse.gov, the request 20 is sent by the user 18 to an ISP 16 that passes the request 20 on to the White House's Web server. The White House Web server takes the request 20 and returns the information to the ISP 16 which, in turn, sends the page to the user 18.

In the case of newsgroups, an ISP 16 determines in advance how many of the tens of thousands of newsgroups it wants to support. It then downloads all postings to those newsgroups on a regular basis. When a user 18 of the ISP 16 wants to download a posting, the only communication is to the ISP 16. If the ISP 16 already has the requested posting (probably as a result of its most recent download), it sends it to the requesting user 18. Therefore, there is no current mechanism in place for the person who originally made the posting to be notified at the time that the ISP 16 sends the posting to its user 18.

One way to enable the person making the posting to warn ISP 16 account holders 12 about objectionable content is to require the person to mark his or her posting in a way that notifies the ISP 16 that the content may be unfit for children (e.g., starting the subject line with "over 18"). Whenever a user 18 wants to download a posting, the ISP 16 could check the subject line to see if it started with "over 18". If so, the ISP 16 could notify the account holder 12 that a posting so labeled was sent to his or her computer (or possibly warn the user 18 first, and notify the account holder 12 only if the user 18 downloads the posting anyway). If the account 14 owner desired, the entire posting could be retained and held for the account holder 12. Alternatively, newsgroups that contain postings that are generally unfit for children could inform the ISP 16 (possibly by including "over 18" in its name) and thereby allow the ISP 16 to notify the account 14 owner of all downloads from that newsgroup without looking for an "over 18" label on the individual posting.

Another way would be to provide a news server 10 programmed to generate notices 64 based on the preferences of the account holder 12. The account holder 12 can designate which newsgroups should result in a notice 64 being sent to the account holder 12. When the Internet access account 14 is used to read one of the designated newsgroups, the notice 64 is sent to the account holder 12. The notice 64 can comprise any of the name of the newsgroup, the identity of the posting (s) read, or even the content of the posting(s) read.

Similar procedures could be used for chat servers, listservs and email messages. Anyone sending something unfit for children could put the same "over 18" language in the subject line, thereby enabling an ISP 16 that reviews the subject line to notify the account holder 12 in the right situation. Either that, or the chat server, listserv, or other email distributor can send notices 64 as described above with the appropriate time, destination IP and communication information.

Finally, even if a user 18 elects to using anonymizing software, a Web site can "look through" the anonymizing server 38 to send a message to the user 18. Since the Web site only knows the IP address of the anonymizing server 38, it sends an email message to ipaddress1@[anonymizingserver].com. If the anonymizing server 38 maintains the proper database, the anonymizing server 38 could then forward the email message to the user 18's server using the address ipaddress2@[userserver].com. Note that the Web site does not need to know who the user 18's ISP 16 is. The user's 18 ISP 16 can then reforward the message to the user's 18 computer.

It should be noted that the present invention complements content-based or origin-based filtering. If a particular site or type of content worries an account holder 12, the account holder 12 can be less aggressive in filtering content from sites that participate in this system. The account holder 12 can rest assured that even if user 18 access questionable material, that such access can be monitored. For example, if a parent is the account holder 12, and 90% of the content of a given site is acceptable to the parent but 10% is not, then the parent does not need to block the site if the ISP 16 and the server 10 implement the present invention. The parent can rest assured that if children access questionable material using the Internet access account 14, then he/she will be informed of the usage and be able to take appropriate action.

From the foregoing, it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

APPENDIX A

```
#!/usr/bin/perl

Tell Your Mom
####################################
Set these ################
$location = "/enter.htm";      # push them where?
$cookiedir = "/tmp/cookieavs"; # must make this writeable by httpd user
$sendmail = "/usr/lib/sendmail"; # location of sendmail binary
###################################
DO NO EDIT BELOW THIS LINE ###
###################################
#GMT = $ENV{'DATE_GMT'}
#LOCAL = $ENV{'DATE_LOCAL'}
#[18/Jun/1998:16 :47:52 -0400]
$offset = "0400"; # 4 hours from gmt
$century = "19";
#Thursday, 18-Jun-98 20:44:32 EST
($weekday,$day,$month,$year,$time) = $ENV {'DATE_GMT'} =~
m/(.*?) \,
(.*?)\-(.*?)\-(.*?) (.*?) /;
$stampdate = "[$day/$month/$century$year -$offset]";
$remote = $ENV{'REMOTE_ADDR'};
$host = $ENV{'REMOTE_HOST'};
$mycookie = "$cookiedir/$remote";
##############################################################
if (-e $mycookie) { $status = "We already told on you!"; &done; } # already
mailed
&cookieout;
if ($remote eq $host) { &done; } # a non-resolvable ip
##############################################################
if ($host =~ m/.*\..*\.../) {
if ($host =~ m/com$|net$|org$|edu$|gov$|mil$/) {
$host =~ m/.*\.(.*?\..*)/;
$sendto = $1;
}
elsif ($host =~ m/\.us$/) {
$host =~ m/.*\.(.*?\..*\.us)/;
$sendto = $1;
}
else { $sendto = "wrong.one"; } ### wont work - foreign?
&mail;
}
else { $sendto =$host; &mail; }
##############################################################
sub done {
print "Content-type: text/plain\n\n";
print "$status\n\n";
```

APPENDIX A-continued

```
exit(0);
}
sub mail {
unless ($host eq "wrong.one") {
$status = "I'm telling Mommy! (ipaddress\@$sendto)";
&sendmail;
}
&done;
}
sub sendmail {
    open (MAIL, "|$sendmail ipaddress\@$sendto,ipaddres\@$sendto") || die
"Can't open $mailprog!\n";
    print MAIL <<EOF;
From: ipaddress\@explained.com
Subject: $whichpage $remote $stampdate
http://$ENV{'HTTP_HOST'}$ENV{'REQUEST_URI'}
This has been an advisory from http://www.explained.com
For more information on the proper use of this service
please contact our Website.
EOF
close (MAIL);
}
########### User Cookie Subs #######################
sub cookieout {
    open (COOKIE, ">$mycookie") || die "error opening $mycookie\n";
    print COOKIE " ";
    close (COOKIE);
}
```

The invention claimed is:

1. A method of enabling an apparatus comprising a server computer to send a notice to a network account holder, the method comprising:
receiving, by an apparatus comprising a server computer, a request for a service from a second computer used by a user and through a first path comprising a network and a third computer used by an ISP having a contractual relationship with a network account holder;
making, by the apparatus, a first determination whether to send a notice to the network account holder via a second path arranged by the ISP and the network account holder, the notice comprising a communication and the second path comprising a standardized communication pathway;
making, by the apparatus, a second determination whether to send a response to the second computer via a third path, the third path comprising the network and the ISP;
if the first determination is to send the notice, generating the notice comprising a communication and
sending the notice to the network account holder via the second path;
wherein the apparatus need know neither an identity of the network account holder nor an identity of the user and neither the notice nor the response need contain the identity of the network account holder or the identity of the user.

2. The method of claim 1 further comprising the step of warning the user that fulfilling the request for the service will result in the sending of the notice.

3. The method of claim 1 wherein the apparatus is a Web server that is sending the response to a hypertext transfer protocol request.

4. The method of claim 3 wherein the response to the hypertext transfer protocol request contains hypertext code that aids in preventing the caching of the Web page.

5. The method of claim 3 wherein the response to the hypertext transfer protocol request contains hypertext code that enables a caching server to send notices on behalf of the apparatus.

6. The method of claim 1 wherein the standardized communication pathway is email.

7. A computer system for enabling an apparatus comprising a server computer to send a notice to a network account holder, the system comprising:
an apparatus comprising a server computer,
a second computer, and
a third computer, the apparatus, the second computer, and the third computer configured such that:
the apparatus receives a request for a service,
makes a first determination whether to send a notice to a network account holder via a second path arranged by an ISP and the network account holder, the notice comprising a communication, the second path comprising a standardized communication pathway,
makes a second determination whether to send a response to a user via a third path, the third path comprising the network and the ISP,
if the first determination is to send the notice, sends the notice to the network account holder via the second path, and
sends the response to the user via the third path,
wherein the server computer need know neither the identity of the network account holder nor the user, and neither the notice nor the response need contain information regarding the identity of the network account holder or the user; and such that
the second computer, corresponding to the user, sends a request for a service to the apparatus via the first path comprising an ISP and a network, the ISP having a contractual relationship with the network account holder; and such that
the third computer, used by the ISP, receives the request for the service and forwards the request for service to the apparatus via the network, the network configured to allow receiving the request for the service and causing the request for the service to be delivered to the apparatus, either directly or indirectly; and wherein:
software, operating on the apparatus, determines that the request for the service warrants sending the notice;
software, operating on the third computer, identifies a notice destination to which the notice is to be sent;
software, operating on the apparatus, generates a notice comprising the communication; and
the standardized communications pathway over which the notice can be sent to the notice destination.

8. The system of claim 7 further comprising software, operating on the apparatus, that generates a warning to the user that fulfilling the request for the service will result in the sending of the notice.

9. The system of claim 7 wherein the service is a hypertext transfer protocol resource.

10. The method of claim 1, further including, if the second determination is to send the response, sending the response to the second computer via the third path.

11. The method of claim 1, wherein the second computer is a cell phone.

12. The method of claim 1, wherein the ISP is a cell phone network.

13. The method of claim 10, wherein the network is the Internet.

14. The method of claim 1, wherein:
the apparatus makes a third determination whether to send a warning to the second computer via the third path before sending either the notice or the response, the warning comprising a communication informing the user that the notice will be sent unless the request for the service is withdrawn or otherwise terminated; and if the third determination is to send the warning, sending the warning to the second computer via the third path; and wherein the warning need not contain information regarding the identity of the network account holder or the identity of the user.

15. An apparatus comprising a server computer to send a notice to a network account holder, the apparatus comprising:

an apparatus comprising a server computer and programmed so that the apparatus:

receives a request for a service from a second computer, corresponding to a user, through a first path comprising a network and a third computer used by an ISP having a contractual relationship with a network account holder;

makes a first determination whether to send a notice to the network account holder via a second path arranged by the ISP and the network account holder, the notice comprising a communication and the second path comprising a standardized communication pathway;

makes a second determination whether to send a response to the second computer via a third path, the third path comprising the network and the ISP;

if the first determination is to send the notice, sending the notice to the network account holder via the second path; and wherein the apparatus need know neither an identity of the network account holder nor an identity of the user, and neither the notice nor the response need contain the identity of the network account holder or the identity of the user.

16. The apparatus of claim 15, wherein the apparatus is programmed so that if the second determination is to send the response, send the response to the second computer via the third path.

17. The apparatus of claim 15, wherein the second computer is a cell phone.

18. The apparatus of claim 15, wherein the ISP is a cell phone network.

19. The apparatus of claim 16, wherein the network is the Internet.

20. The apparatus of claim 16, wherein:

the apparatus makes a third determination whether to send a warning to the second computer via the third path before sending either the notice or the response, the warning comprising a communication informing the user that the notice will be sent unless the request for the service is withdrawn or otherwise terminated; and if the third determination is to send the warning, send the warning to the second computer via the third path; and wherein the warning need not contain information regarding the identity of the network account holder or the identity of the user.

* * * * *